United States Patent Office 2,998,095
Patented Aug. 29, 1961

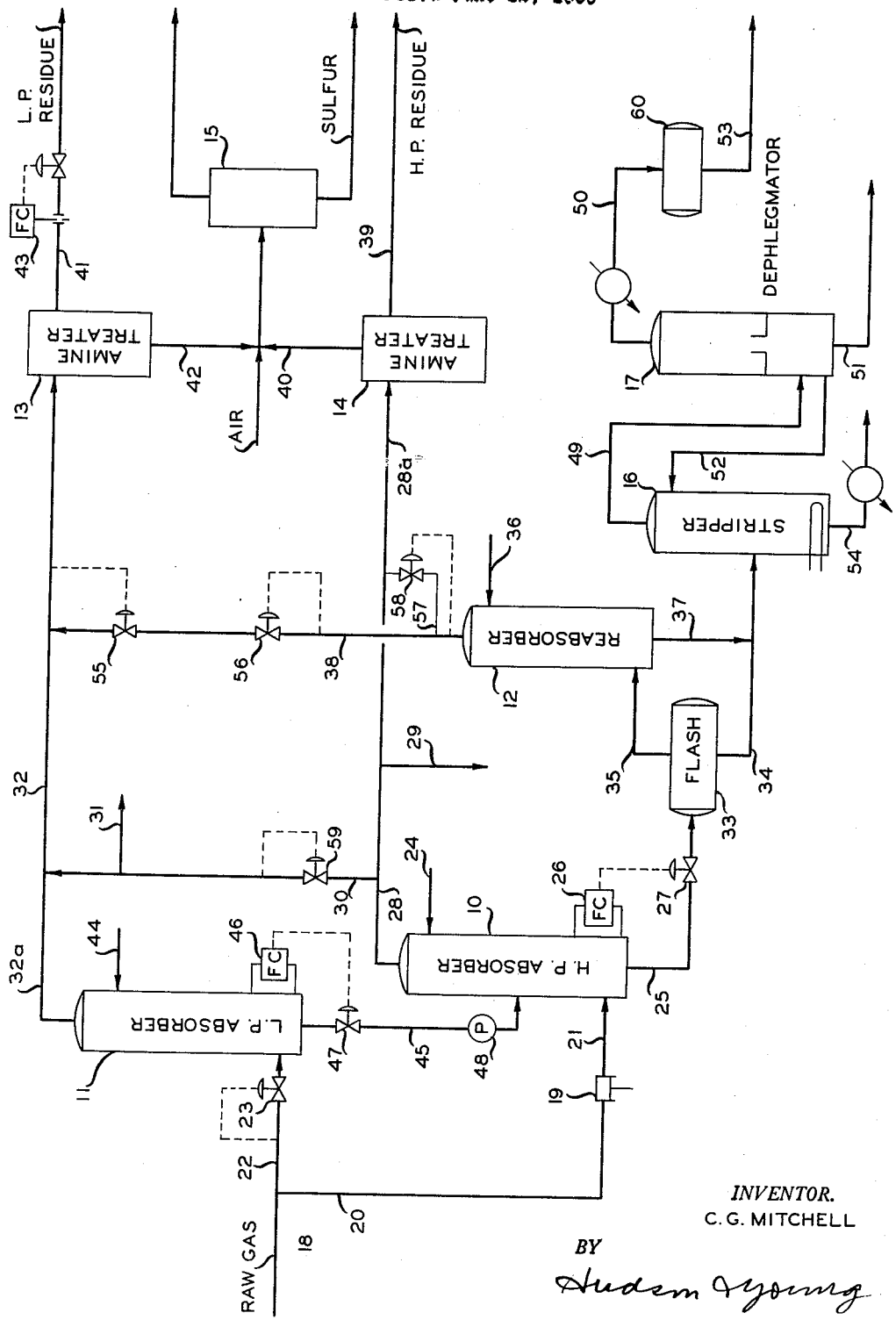

2,998,095
GAS ABSORPTION
Charles G. Mitchell, Bartlesville, Okla., assignor to Phillips Petroleum Company, a corporation of Delaware
Filed June 12, 1959, Ser. No. 819,938
5 Claims. (Cl. 183—2)

This invention relates to a method and apparatus for treating gas. In one of its aspects, the invention relates to a process for supplying treated gas by compressing the gas, passing the compressed gas to an absorber, thereby removing a portion of the heavier constituents, and passing the unabsorbed gas to a treated gas supply conduit at a lower pressure. In another aspect, the invention relates to a method of treating natural gas which comprises removing heavier constituents in a high pressure absorption zone and supplying the unabsorbed gas at a lower pressure to a treated gas outlet. In another aspect, the invention relates to a method for treating natural gas comprising contacting at least a portion of the gas in a high pressure absorber, flashing the rich oil from the high pressure absorber and passing the resulting vapors to a second absorption zone wherein heavier constituents are removed and supplying any excess gas, above the capacity of the first absorber to a low pressure absorber, supplying all the unabsorbed gas from the second absorber, any unabsorbed gases from the low pressure absorber, and a portion of the unabsorbed gases from the first absorber to a relatively low pressure residue gas stream, and supplying a portion of the unabsorbed gases from the high pressure absorber to a relatively high pressure gas stream. In another aspect, this invention relates to means for treating gas comprising a high pressure absorber, means for supplying at least a portion of the gas to be treated to the high pressure absorber, a flash tank, rich oil conduit means connecting said flash tank with the high pressure absorber, a vapor conduit from the flash tank to the reabsorber, a conduit for removing unabsorbed gases from the reabsorber and pressure reducing means in the latter conduit for supplying treated gas at a relatively low pressure. In another of its aspects, this invention relates to apparatus for treating gas comprising a high pressure absorber, a low pressure absorber, and a reabsorber, means for supplying at least a portion of the gas to be treated to said high pressure absorber, a flash tank for rich oil from said high pressure absorber, means to supply vapors from the flash tank to the reabsorber, means for supplying excess gas to the low pressure absorber, means to supply a stream of treated gas comprising the unabsorbed gas from the reabsorber and the low pressure absorber and a portion of the unabsorbed gas from the high pressure absorber.

It is well known that a portion of the heavier constituents of natural gas may be removed from the gas prior to distributing the gas to be used as fuel or for other purposes thereby preventing problems due to condensation of the heavier constituents in the gas distribution system and also providing valuable liquid components such as liquefied petrolium gas, gasoline, etc. It has also been known to use absorbers for removing such heavier constituents. It is sometimes desirable to provide separate low pressure and high pressure gas streams from the gas treating facility. In the past, when such is the case, a relatively low pressure absorber has been used to supply gas to the low pressure outlet and a high pressure absorber to supply gas to the high pressure outlet. In this type of operation, however, frequently the low pressure gas stream contains a larger portion of the heavier constituents than is desirable, thus resulting in a loss of recoverable heavier constituents.

It is an object of the present invention to increase the recovery of valuable heavier constituents from natural gas. Another object of the invention is to provide gas treating apparatus which allows more flexibility in operation to take care of varying conditions of quality of gas supplied, amount of gas supplied, amount and quality of gas required in high and low gas pressure distribution systems, etc. Another object of the invention is to improve the efficiency of gas treating operations.

Other aspects, objects and the several advantages of the invention are apparent from a study of the disclosure, the drawing and the appended claims.

According to the present invention there is provided an improved gas treating process comprising compressing at least a portion of the gas, contacting the compressed gas with an absorption oil, and supplying unabsorbed gases to a relatively low pressure gas outlet. Also, according to this invention, there is provided an improved gas treating apparatus comprising a high pressure absorber, means to supply gas to the absorber, and means to reduce the pressure of the unabsorbed gases removed from the absorber and to supply the resulting relatively low pressure gases to a treated gas conduit.

In a more specific embodiment, there is provided an apparatus for treating natural gas, comprising a high pressure absorber, means to supply at least a portion of the gas to be treated to the high pressure absorber, a flash tank, means to supply lean absorption oil to the high pressure absorber, means to conduct rich absorption oil from the high pressure absorber to the flash tank, vapor conduit means connecting the flash tank with a reabsorber, a low pressure absorber, means to supply gas above the capacity of the high pressure absorber to the low pressure absorber, a low pressure treated gas conduit communicating with the upper portion of the low pressure absorber, the high pressure absorber, and the reabsorber, and a high pressure treated gas conduit communicating with the upper portion of the high pressure absorber.

In another embodiment, rich oil from the low pressure absorber is supplied to the high pressure absorber as a portion of the lean oil to the latter absorber.

In another embodiment there is provided an improved method for treating gas comprising passing at least a portion of the gas to be treated to a high pressure absorption zone, passing rich oil from the high pressure absorption zone to a flash zone, passing vapor from the flash zone to a reabsorption zone, passing gas in excess of that needed to supply said high pressure absorption zone to a low pressure absorption zone, providing a relatively low pressure treated gas stream comprising the unabsorbed gases from the reabsorption zone, the unabsorbed gases from the low pressure absorption zone, and a portion of the unabsorbed gases from the high pressure absorption zone.

In a more specific embodiment, this invention comprises a process for treating natural gas comprising passing at least a portion of the gas to be treated to a high pressure absorption zone, passing rich oil from the high pressure absorption zone to a flash zone, passing vapors from the flash zone to a reabsorption zone, supplying less than all of the gas to be treated to a low pressure absorption zone, supplying lean absorption oil to the low pressure absorption zone, passing rich oil from the low pressure absorption zone to the high pressure absorption zone, supplying additional lean oil to the high pressure absorption zone, providing a relatively low pressure stream of treated gas comprising unabsorbed gases from the reabsorption zone, the high pressure absorption zone, and any unabsorbed gases from the low pressure absorption zone, and a relatively high pressure stream of treated gases comprising unabsorbed gases from the high pressure absorption zone.

Referring now to the drawing, the primary items of the apparatus include high pressure absorber 10, low pressure absorber 11, reabsorber 12, amine treaters 13 and 14, H₂S converter 15, stripper 16, and dephlegmator 17. These major items of equipment are connected by pipes, as shown, and auxiliary apparatus such as valves, compressors, pumps, controllers, and heaters, most of which are not shown, are provided as necessary for carrying out the process, the installation and use of this auxiliary equipment being understood by those skilled in the art.

In operation, low pressure natural gas, for example, at 50 pounds per square inch, enters through inlet pipe 18. The gas is conveyed to high pressure absorber 10 by means of compressor 19, where the pressure is raised to, for example, 600 pounds per square inch, conduit 20 and conduit 21. Inlet pipe 18 also communicates with low pressure absorber 11 through conduit 22, controlled by back pressure valve 23. Lean oil is supplied to high pressure absorber 10 through lean oil inlet 24 and rich oil is discharged through rich oil effluent line 25, the flow of rich oil being controlled by liquid level control 26, which actuates valve 27. Additional absorption oil is sometimes supplied from conduit 45 by pump 48 as explained below. Effluent unabsorbed gas from high pressure absorber 10 is discharged through effluent gas line 28 and the gas discharged therethrough flows to amine treater 14, field repressure conduit 29, or to conduit 30, which connects with fuel supply line 31 and low pressure treated gas line 32. The portion of line 28 downstream from conduit 29 has been numbered 28a. The portion of line 32 upstream from line 30 has been numbered 32a. The rich oil from line 25 enters flash tank 33 and thence through liquid outlet 34 to stripper 16. The vapor which is disengaged in flash tank 33 flows through vapor outlet 35 into reabsorber 12. Lean oil enters reabsorber 12 through lean oil inlet 36 and rich oil is discharged through rich oil effluent line 37. Unabsorbed gases from reabsorber 12 pass through effluent gas line 38 which connects with low pressure treated gas line 32. The gas which flows from high pressure absorber 10 to amine treater 14 is there treated to obtain a high pressure sweet gas stream which is removed through outlet 39 and a hydrogen sulfide stream which flows through outlet 40. Any unabsorbed gas from low pressure absorber 11 flows through low pressure treated gas line 32 to amine treater 13 together with unabsorbed gas from reabsorber 12 and a portion of the unabsorbed gas from high pressure absorber 10. This gas stream is treated to produce low pressure sweet gas which is discharged through outlet 41 and a stream of hydrogen sulfide which is discharged through outlet 42. The hydrogen sulfide from amine treaters 13 and 14 is reacted with air in H₂S converter 15 to produce free sulfur. The flow of gas in outlet 41 is controlled by flow controller 43.

Low pressure absorber 11 is provided with lean oil inlet 44, and rich oil effluent line 45. Line 45 is regulated by liquid level controller 46 which actuates valve 47. Line 45 communicates with high pressure absorber 10 through pump 48 and thus the rich oil effluent from low pressure absorber 11 is used as a relatively lean oil in high pressure absorber 10 to remove additional relatively heavy constituents from the gas, the rich oil effluent from high pressure absorber 10 thus containing all of the constituents absorbed in both high pressure absorber 10 and low pressure absorber 11. It is this combined stream which flows into flash tank 33.

The combined rich oil streams from outlet 34 and line 37 enter stripper 16 where they are heated, thus producing a vapor stream which goes overhead through line 49 to dephlegmator 17. This overhead stream contains substantially all of the heavier constituents removed from the gas plus some steam and absorption oil. This stream is separated in dephlegmator 17 and the heavier constituents from the gas removed through overhead line 50, the water through line 51, and the absorption oil through line 52 through which it is returned to stripper 16. The heavier constituents from the gas are condensed, collected in storage tank 60, and removed through line 53. Lean absorption oil is removed from stripper 16 through line 54 from which it is returned to the three absorbers through inlets 24, 36, and 44.

Back pressure valve 55 is adapted to close when the pressure in line 32 exceeds a predetermined minimum, thus preventing flow of gas from reabsorber 12 in an amount which would cause the pressure in line 32 to exceed the desired figure. Valve 56 also is pressure actuated and is adapted to close when the pressure in line 38 falls below a predetermined minimum, thus preventing back flow from line 32. To prevent an undesired buildup of pressure when valve 55 is closed, branch conduit 57 and pressure actuated valve 58 permit flow of gas from reabsorber 12 to line 28 when the pressure at the outlet of reabsorber 12 exceeds a predetermined figure. Suitable means (not shown) are provided in line 32a to prevent back flow through low pressure absorber 11 when no gas is being processed through this unit.

Valve 59 in conduit 30 operates in a manner similar to valve 55 in that it permits flow when the pressure in line 32 is below a predetermined minimum but closes when this pressure exceeds that amount. Fuel is provided for plant operation through fuel supply line 31, which in turn is supplied from line 32 or line 28, depending upon the pressure in line 32 and thus the position of valve 59.

It will be seen that the gas treating system disclosed herein provides for considerable flexibility in operation. When the flow of gas from the field is below the capacity of compressor 19 and high pressure absorber 10 substantially all of the gas is processed through the high pressure system, thus resulting in maximum recovery of the heavier constituents of the gas. During this type of operation valves 55, 56, and 59 will be open and valve 58 will be closed. Gas is supplied to line 32 from the high pressure absorber through lines 28 and 30 and from the reabsorber through line 38. However, flow through line 41, and thus through line 32, is controlled by rate of flow controller 43. Thus, if the supply of gas to line 32 is greater than needed, there will be a buildup of pressure in this line.

Since the B.t.u. content of the gas from the high pressure absorber 10 normally will be less than the minimum required in line 41, when it is necessary to reduce the flow of gas to line 32, and line 41, the flow from line 28 is reduced prior to reducing the flow from line 38. This is accomplished by adjusting valve 59 to close at a slightly lower pressure than the pressure at which valve 55 closes. Thus, as the flow in line 32 increases, valve 59 will throttle the flow through line 30 thus permitting a portion of the gas to flow through amine treater 14 and high pressure outlet 39. If the flow through line 38 alone should be sufficient to supply the desired flow through line 32 and line 41, valve 59 will be completely closed and, excess pressure buildup will be prevented by valve 55.

When the flow of gas from the field exceeds the capacity of the high pressure treating system, the pressure builds up in conduits 20 and 22, thus opening valve 23 permitting flow of a portion of the gas through low pressure absorber 11. As the flow of gas from this source through line 32 increases, valves 59 and 55 will be actuated, as described above, to throttle or cut off the flow from first line 28 and then line 38 to line 32.

In a typical operation of the system of this invention the flow of gas into the treating plant from the field gathering system is 265 million cubic feet per day. This is within the capacity of the high pressure absorber, so all the flow is through the high pressure system. The desired flow from the low pressure outlet 41 is 35 million cubic feet per day. With a typical gas composition the outlet from high pressure absorber 10 through line 28 is 221.5 million cubic feet of gas having a heating value of 1,050 B.t.u. per cubic foot. The flow through line 38 is 21 million cubic feet of gas having a heating value of 1,220 B.t.u. per cubic foot. The demand for fuel through line 31 is 1 million cubic feet per day and the supply for field repressuring through line 29 is 20 million cubic feet. Thus, the flow into line 32 from line 30 must be 14 million cubic feet (35 minus 21) and valve 59 throttles to provide a total of 29 million cubic feet (14 plus 15). The flow through amine treater 14 is the difference between the flow out of high pressure absorber 10, 221.5 million cubic feet, and the sum of the flow through line 30 and line 29 (29 plus 20) or 49. This difference is 172.5 million cubic feet. The flow through lines 39 and 41 is slightly less than the flow into amine treaters 14 and 13, respectively, due to the removal of hydrogen sulfide therein but the reduction normally is small. For example, with 172.5 million cubic feet flowing into amine treater 14 in a typical situation, the flow through line 39 is 172 million cubic feet. With the flow rounded off to the nearest half million cubic foot, the flow in lines 32 and 41 are shown to be the same, although as stated, a small portion of the stream is taken off through line 41. Under these conditions, the recovery of heavier constituents through line 53 is 750,000 gallons per day.

Prior to the present invention, it was customary to flow through the low pressure absorber system the amount needed for the low pressure outlet 41 and fuel outlet 31. The apparatus of the present invention can be used to illustrate the type of operation practiced prior to the present invention. For this illustration, it is necessary to assume that lines 30 and 38 remain closed at all times and that line 57 remains open. Under these conditions and, in a situation comparable with that described above, that is, with 265 million cubic feet entering the plant from the field and with 35 million being removed through line 41 and 15 million through line 31, the flow from the low pressure absorber through line 32a is 50 million cubic feet. The flow from high pressure absorber 10 is 114.5 million cubic feet and from reabsorber 12 the flow is 21 million cubic feet. With the same flow to the field repressuring system as in the previous example, 20 million cubic feet, the flow out of the high pressure system is 175.5 million cubic feet.

Under these conditions of operation, the heavier constituents recovered total 651,700 gallons per day. Thus, it is seen that there is an increase in recovery of these constituents by the practice of the present invention of 98,300 gallons per day.

The above data are summarized in the following table.

| Stream No. | Present invention | | Prior practice | |
|---|---|---|---|---|
| | MM c.f./day | Heating value,B.t.u. | MM c.f./day | Heating value,B.t.u. |
| 18 | 265 | 1,253 | 265 | 1,253 |
| 21 | 265 | 1,253 | 265 | 1,253 |
| 22 | 0 | 1,253 | | 1,253 |
| 28 | 221.5 | 1,050 | 174.5 | 1,050 |
| 28a | 172.5 | 1,050 | 175.5 | 1,070 |
| 29 | 20 | 1,050 | 20 | 1,050 |
| 30 | 49 | 1,050 | 0 | |
| 31 | 15 | 1,050 | 15 | 1,185 |
| 32 | 35 | 1,150 | 35 | 1,185 |
| 32a | 0 | | 50 | 1,185 |
| 38 | 21 | 1,220 | 0 | |
| 39 | 172 | 1,050 | 175 | 1,070 |
| 41 | 35 | 1,150 | 35 | 1,185 |
| 57 | 0 | | 21 | 1,220 |

Under the conditions of the example of the operation of the present invention described above, the B.t.u. content of the stream from low pressure outlet 41 is substantially equal to the minimum prescribed for this stream, 1,150 B.t.u. per cubic foot. If conditions change, such that the heating value of this gas stream would fall below the minimum required as, for example, if a larger flow were required through this stream, it is possible to adjust the heating value by permitting a portion of the flow to be treated in low pressure absorber 11. This may be accomplished by adjustment of the pressure at which valve 23 operates or by placing valve 23 under the control of a B.t.u. controller, not shown. Such a controller is known in the prior art and could be installed in the present system to open valve 23 when the heating value of the low pressure stream falls below that desired and to close the valve as the heating value increases. The B.t.u. content of the low pressure gas may be increased by reducing the back pressure held on reabsorber 12 by back pressure regulator 56.

Reasonable variation and modification are possible within the scope of the foregoing disclosure, the drawing, and the appended claims to the invention, the essence of which is a method and apparatus for treating gas to remove heavier constituents by compressing and absorbing at a relatively high pressure at least a portion of the gas to be treated and then reducing the pressure to the desired outlet value and, in some embodiments, supplying at least a portion of the low pressure outlet gas from the unabsorbed gases from a reabsorber which treats vapors removed from the rich oil from the high pressure absorber.

I claim:

1. A process for treating gas, comprising compressing an amount of said gas, contacting said amount with an absorption oil in a first absorption zone, passing said oil containing absorbed fractions to a flash zone wherein there are formed vapor and liquid phases, contacting said vapor phase with an absorption oil in a second absorption zone, contacting any gas in excess of said amount with an absorption oil in a third absorption zone, and supplying a stream of treated gas comprising unabsorbed gas from said first zone, unabsorbed gas from said second zone, and any unabsorbed gas from said third zone.

2. A process for treating gas, comprising compressing an amount of said gas and passing said amount of gas to a high pressure absorption zone, contacting gas in excess of said amount with an absorption oil in a low pressure absorption zone, passing said absorption oil from said low pressure absorption zone to said high pressure absorption zone, contacting in said high pressure absorption zone said amount of gas with said absorption oil from said low pressure absorption zone, passing said absorption oil from said high pressure absorption zone to a flash zone wherein there are formed vapor and liquid phases, contacting said vapor phase with an absorption oil in a third absorption zone, and supplying a stream of treated gas comprising unabsorbed gas from said low pressure absorption zone, unabsorbed gas from said high pressure absorption zone, and unabsorbed gas from said third zone.

3. A process for treating gas, comprising compressing an amount of said gas and contacting said amount with an absorption oil in a first absorption zone, passing said oil containing absorbed fractions to a flash zone wherein there are formed vapor and liquid phases, contacting said vapor phase with an absorption oil in a second absorption zone, contacting any gas in excess of said amount with an absorption oil in a third absorption zone, supplying a stream of relatively high B.t.u. gas comprising unabsorbed gas from said first zone, unabsorbed gas from said second zone, and any unabsorbed gas from said third zone, and supplying a relatively low B.t.u. gas stream comprising unabsorbed gas from said first absorption zone.

4. Means for treating gas, comprising a compressor, a conduit supplying gas to the inlet of said compressor, a first absorber, a conduit connecting the outlet of said compressor with said first absorber, a flash tank, a conduit connecting said first absorber to said flash tank for supplying rich oil thereto, a second absorber, a conduit connecting said flash tank to said second absorber for supplying vapor thereto, a third absorber, a pressure controlled conduit connecting said conduit for supplying gas to the inlet of said compressor with said third absorber, a conduit communicating with said first, second and third absorbers for removing unabsorbed gases therefrom.

5. Means for treating gas, comprising a compressor, a conduit connected with the inlet of said compressor for supplying gas thereto, a first absorber, a conduit connecting the outlet of said compressor with said first absorber, a flash tank, a conduit communicating with the lower portion of said first absorber and with said flash tank, a second absorber, a conduit connected with the upper portion of said flash tank and with said second absorber, a third absorber, a pressure controlled conduit communicating with said conduit connected with the inlet of said compressor and with said third absorber, a first conduit for unabsorbed gas connected with the upper portion of said first absorber, a second conduit for unabsorbed gas connected with the upper portion of said second absorber, a third conduit for unabsorbed gas connected with the upper portion of said third absorber, a first conduit for treated gas communicating with said first, second, and third conduits for unabsorbed gas, and a second conduit for treated gas communicating with said first conduit for unabsorbed gas.

References Cited in the file of this patent

UNITED STATES PATENTS 2,608,516  Miller _____ Aug. 26, 1952